J. HERMANOWITZ.
CALIPERS OR DIVIDERS.
APPLICATION FILED MAR. 23, 1914.
1,104,890.
Patented July 28, 1914.
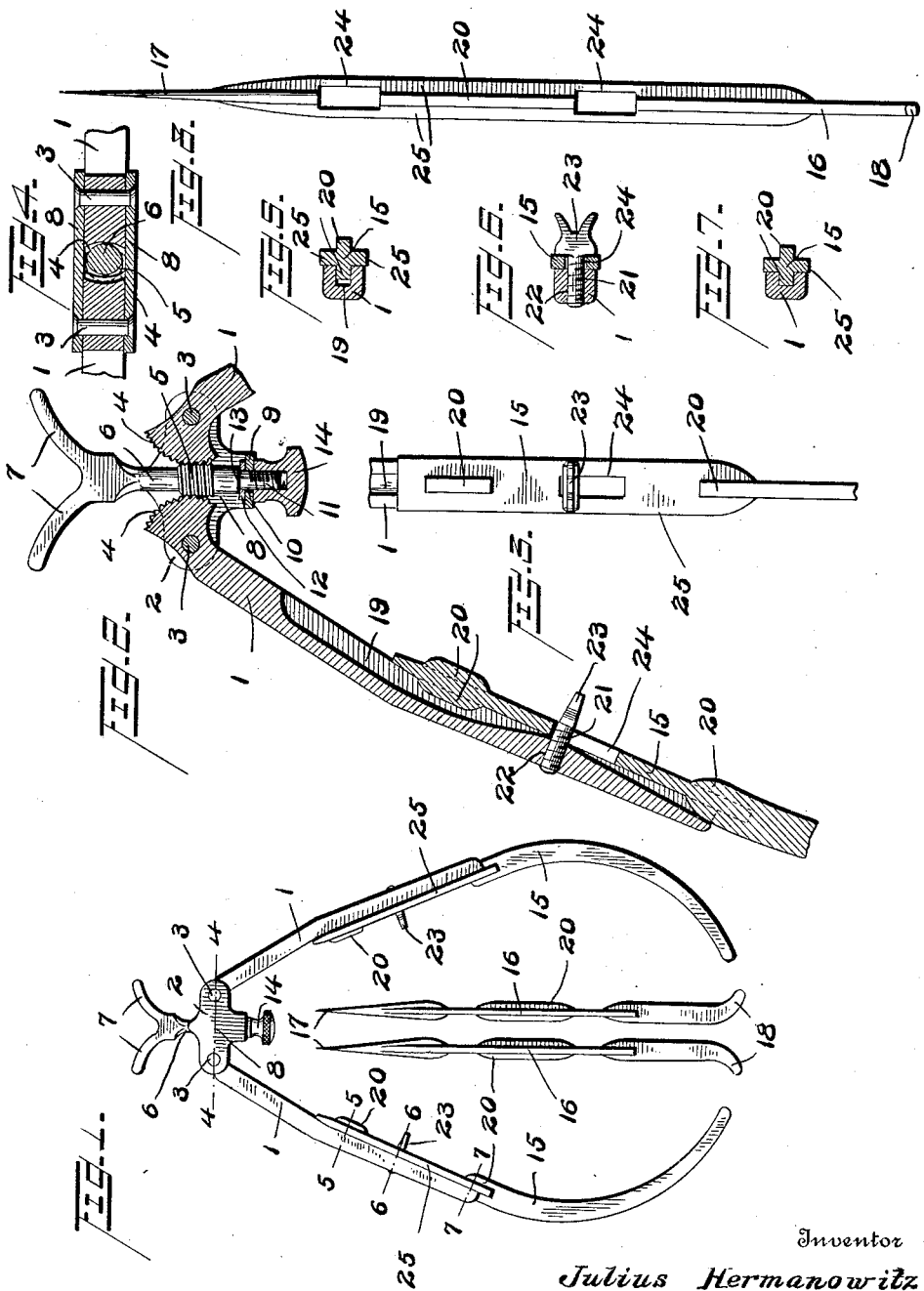
Witnesses
Harold Strauss
C. R. Ziegler.
Inventor
Julius Hermanowitz
By Joshua R. H. Potts.
Attorney

UNITED STATES PATENT OFFICE.

JULIUS HERMANOWITZ, OF PHILADELPHIA, PENNSYLVANIA.

CALIPERS OR DIVIDERS.

1,104,890.  Specification of Letters Patent.  Patented July 28, 1914.

Application filed March 23, 1914. Serial No. 826,617.

*To all whom it may concern:*

Be it known that I, JULIUS HERMANOWITZ, a subject of the Czar of Russia, residing at Philadelphia, in the county of Philadelphia, and State of Pennsylvania, have invented certain new and useful Improvements in Calipers or Dividers, of which the following is a specification.

My invention relates to improvements in calipers or dividers, the object of the invention being to provide an instrument of this character which is provided with improved means for moving the legs and locking them at any adjustment.

A further object is to provide an improved means for connecting attachments to the legs which securely holds the attachment and permits of the reversal of the attachment so as to permit the instrument a wide range of usefulness.

With these and other objects in view, the invention consists in certain novel features of construction and combinations and arrangements of parts as will be more fully hereinafter described and pointed out in the claims.

In the accompanying drawings: Figure 1 is a view in side elevation illustrating two of the attachments connected to the legs of the instrument and two additional attachments independent thereof. Fig. 2 is a fragmentary view in longitudinal section on an enlarged scale illustrating the means for adjusting the legs of the instrument and the means for connecting an attachment to one of the legs. Fig. 3 is a fragmentary view in elevation showing an attachment secured to the leg of the instrument. Fig. 4 is a view in section on an enlarged scale on the line 4—4 of Fig. 1. Fig. 5 is a view in section on the line 5—5 of Fig. 1. Fig. 6 is a similar view in section on the line 6—6 of Fig. 1. Fig. 7 is a view in section on the line 7—7 of Fig. 1, and Fig. 8 is a view in elevation of one of the attachments shown in Fig. 1.

1, 1 represent the legs of the instrument which are pivotally secured in a frame 2 by means of rivets 3, and at their pivoted ends the legs 1 are provided with worm segments 4 meshing with a worm 5 between them. The segments 4 are curved transversely as well as concentrically so as to provide a relatively large contacting surface with the worm, but the latter constitutes but a relatively few threads or turns as clearly shown in Fig. 2. The worm 5 is an integral part of the worm shaft 6, the latter having at its outer end wings 7 to facilitate the turning of the shaft. The frame 2 consists of parallel side plates 8, 8 connected at their inner ends by an integral cross bar 9, the latter having an opening 10 therein through which the reduced and threaded end 11 of the shaft 6 projects. A washer 12 is positioned around the reduced end 11 of shaft 6, and between the bar 9 and an annular shoulder 13 formed on the shaft at the juncture of the reduced portion 11 with the larger diameter of said shaft. A lock nut 14 is screwed onto the threaded end 11, and when jammed against the bar 9, will securely hold the worm shaft against turning movement, and thereby lock the instrument at any position of adjustment. The nut 14 serves to limit the longitudinal movement of the shaft 6, hence when this nut is loosened, the legs 11 are permitted a certain amount of quick adjustment as the shaft 6 will be moved longitudinally by the pivotal movement of the legs within the limit permitted by the nut 14. I provide two pair of attachments, both pairs of which are shown in elevation in Fig. 1. The attachments 15 constitute caliper members which when in the position shown in Fig. 1 are for measuring outside diameters or other linear measurements, and when reversed so that they curve outwardly instead of inwardly, they are adapted for measuring inside diameters. The attachments 16 have pointed ends 17 and curved ends 18, and these attachments may be positioned with either end exposed as will be hereinafter explained so that by reversing them in connection with the legs 1, they are capable of a wide range of usefulness. The legs 1 on their inner faces are provided with longitudinal grooves 19 to receive longitudinal webs 20 on the attachments, and set screws 21 are located in threaded openings 22 in the legs 1, and have heads 23 constituting turn buttons which are adapted to be projected through slots 24 in the attachments, and when turned at a right angle to the slot, securely lock the attachment to the leg of the instrument. The attachments 16 are provided with two of these slots 24 so that they may be reversed with relation to the legs of the instrument, and with this form of attachment, I preferably provide the webs 20 of a length throughout the greater portion of the attachment. The attachments, where they engage the legs 1, are enlarged transversely so that they form in effect, relatively wide strips 25 with the webs 20 between their side edges. The strips 20 are of the same width as the legs 1, and are securely clamped against the inner surface of the legs by the screws 21. The grooves 19 extend substantially throughout the length of the leg, but at the opening 22 for the screw 21, the inner wall of the groove bulges outwardly so that a relatively long bearing is had for the screw.

With my improved device above described, different attachments may be readily secured to the legs and can be used in many ways, both in measuring and in scoring, and I do not limit myself to any particular use of the instrument.

By reason of my improved means for operating the legs, they may be spread out as far as desired, and in fact, the legs may be brought to a position in substantial alinement so that the full capacity of the instrument may be had.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An instrument of the character described, comprising a frame having side plates, a bar connecting the side plates and having an opening therein, legs pivotally connected to the frame between the side plates and having worm segments, a shaft having a reduced end projected through said opening, a nut screwed onto the reduced end of said shaft, a worm on the shaft engaging the worm segments, and an enlargement on the end of the shaft, substantially as described.

2. An instrument of the character described, comprising a frame having side plates, a bar connecting the side plates and having an opening therein, legs pivotally connected to the frame between the side plates and having worm segments, a shaft having a reduced end projected through said opening, a nut screwed onto the reduced end of said shaft, a worm on the shaft engaging the worm segments, and an enlargement on the end of the shaft, said shaft having an annular shoulder thereon, and a washer around the shaft interposed between the shoulder and the cross bar, substantially as described.

3. An instrument of the character described, comprising a frame, legs pivotally secured in the frame and having worm segments at their ends curved transversely, a worm shaft mounted in the frame and having a worm thereon engaging the segment, means for turning the worm shaft, and means controlling the longitudinal movement of the worm shaft and regulating the quick adjustment of the legs, substantially as described.

4. An instrument of the character described, comprising a frame, legs pivotally connected to the frame, means for moving the legs on their pivots, said legs having longitudinal grooves in their inner faces, attachments adapted to bear against the inner faces of the legs and having longitudinal webs thereon positioned in the grooves of the legs, and means for clamping the attachments against the legs, substantially as described.

5. An instrument of the character described, comprising a frame, legs pivotally connected to the frame, means for moving the legs on their pivots, said legs having longitudinal grooves in their inner faces, attachments adapted to bear against the inner faces of the legs and having longitudinal webs thereon positioned in the grooves of the legs, said attachments having longitudinal slots therein, and screws in the legs having heads thereon adapted to be positioned through the slots of the attachments and when turned at an angle thereto, clamp the attachments against the legs, substantially as described.

In testimony whereof I have signed my name to this specification in the presence of two subscribing witnesses.

JULIUS HERMANOWITZ.

Witnesses:
  DAVID NEUMAN,
  WILLIAM KATIN.

---

Copies of this patent may be obtained for five cents each, by addressing the "Commissioner of Patents, Washington, D. C."